United States Patent [19]

Ressl

[11] Patent Number: 5,558,767
[45] Date of Patent: Sep. 24, 1996

[54] CATALYST REGENERATION PROCEDURE USING NET GAS EQUIPMENT

[75] Inventor: Charles T. Ressl, Mount Prospect, Ill.

[73] Assignee: UOP, Des Plaines, Ill.

[21] Appl. No.: 365,669

[22] Filed: Dec. 29, 1994

[51] Int. Cl.[6] ............................ B01J 20/34; B01J 38/12; C10G 49/22
[52] U.S. Cl. ........................ 208/105; 208/103; 208/104; 502/38
[58] Field of Search ............................... 502/38; 208/103, 208/104, 105

[56] References Cited

U.S. PATENT DOCUMENTS

| | | | |
|---|---|---|---|
| 2,845,409 | 7/1958 | Pennington et al. | 260/93.1 |
| 3,046,235 | 7/1962 | King et al. | 252/411 |
| 4,333,819 | 6/1982 | Scheifele, Jr. | 208/101 |
| 5,002,915 | 3/1991 | Harandi et al. | 502/51 |

*Primary Examiner*—Asok Pal
*Assistant Examiner*—Alexander G. Ghyka
*Attorney, Agent, or Firm*—Thomas K. McBride; John G. Tolomei; Michael A. Moore

[57] ABSTRACT

A method of converting a hydrocarbon feed with a catalyst and regenerating the catalyst by contact with an oxygen-containing stream is disclosed. The hydrocarbon conversion process employs a purification zone that purifies a net gas stream and that also removes water from a circulating regeneration gas stream. This method is useful for the regeneration of reforming catalysts comprising L-zeolite.

11 Claims, 1 Drawing Sheet

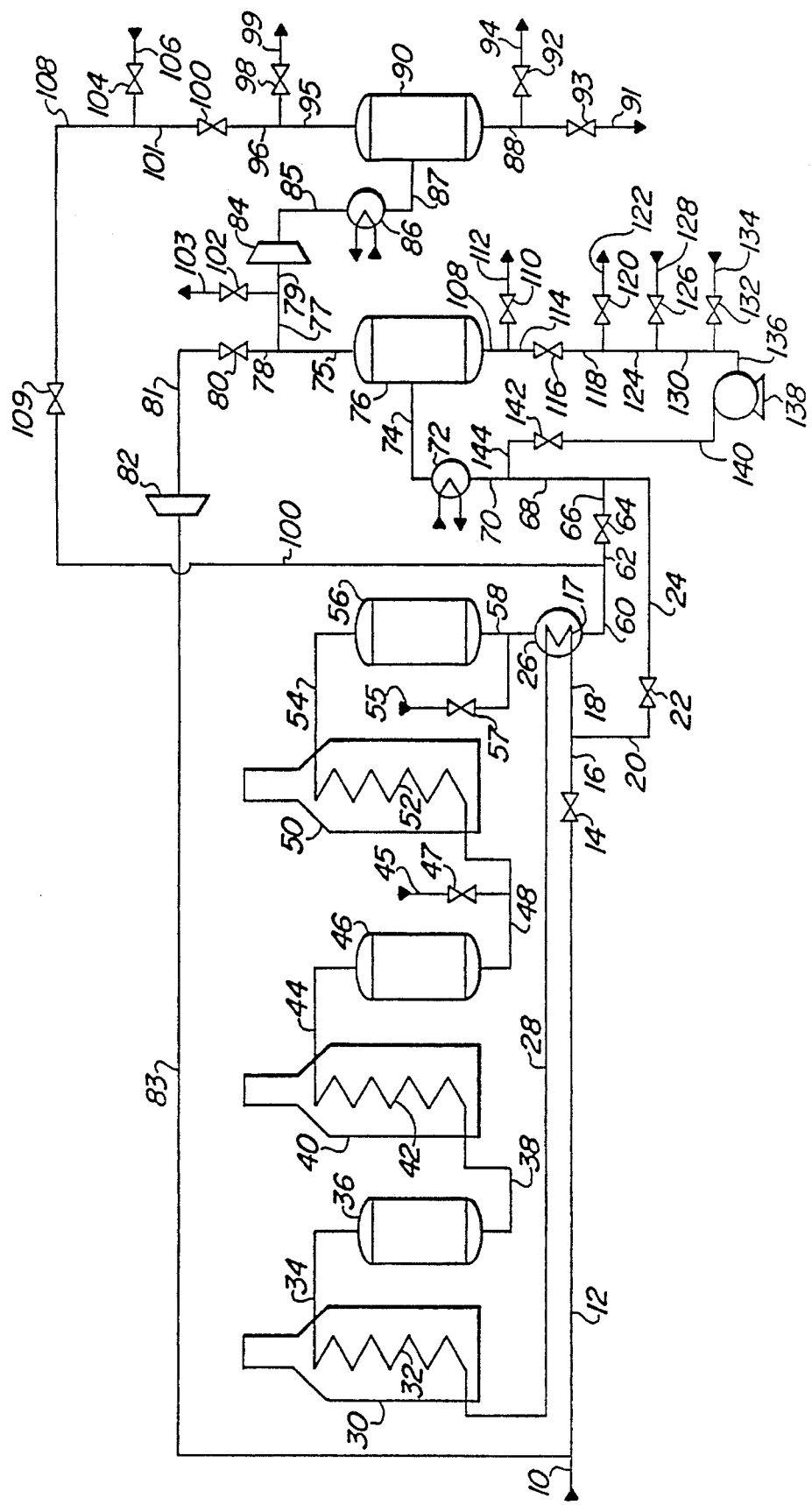

CATALYST REGENERATION PROCEDURE USING NET GAS EQUIPMENT

FIELD OF THE INVENTION

The present invention relates to the regeneration of hydrocarbon conversion catalysts that are water-sensitive and more specifically to catalysts used for the catalytic reforming of gasoline-range hydrocarbons.

BACKGROUND OF THE INVENTION

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline and the rising demands of high-performance internal-combustion engines are increasing the required knock resistance of the gasoline component as measured by gasoline "octane" number. The catalytic reforming unit, therefore, must operate more efficiently at higher severity in order to meet these increasing aromatics and gasoline-octane needs. This trend creates a need for more effective reforming catalysts for application in new and existing process units.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction, thus producing a higher yield of aromatics and a lower output of fuel gas, while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates, as well as naphthas, has been disclosed. The sensitivity to water during regeneration of reforming catalysts in general, and of these selective catalysts in particular, also is known.

Catalytic processes for the conversion of hydrocarbons are well known and extensively used. Invariably, the catalysts used in these processes become deactivated for one or more reasons. Where the accumulation of coke deposits causes the deactivation, regeneration of the catalyst to remove coke deposits restores the activity of the catalyst. Coke is normally removed from the catalyst by contact of the coke-containing catalyst at high temperature with an oxygen-containing gas to combust and remove the coke. This regeneration can be carried out in situ or the catalyst may be removed from the reactor where the hydrocarbon conversion takes place and transported to a separate regeneration zone for coke removal.

Many hydrocarbon conversion processes, such as naphtha reforming processes, employ two or more separate reactors through which a hydrocarbon feed stream passes in series. Typically, each reactor contains a bed of catalyst. The hydrocarbon feed stream passes from one reactor to the next reactor in series through conduits. In naphtha reforming, the hydrocarbon conversion reactions are endothermic, and, therefore, a heater is typically located upstream of each reactor in order to provide the necessary heat of reaction to the hydrocarbon feed stream. In addition, an indirect heat exchanger is typically located downstream of the last reactor in the series, in order to conserve energy by recovering heat from the effluent stream and transferring that heat to the feed stream upstream of the first heater.

Many reforming processes employ a compressor to compress the hydrogen-rich net gas from the reforming process from the relatively low pressure of the reforming reactors to a relatively high pressure that is required for the net gas to be employed in other downstream processing units. Also, many reforming processes employ a chiller to cool the net gas in order to condense and recover the light hydrocarbons that are present in the net gas. The purified net gas is then employed in other downstream processing units. Some reforming processes employ both a net gas compressor and a net gas chiller. In these processes, the combination of the elevated pressure and the reduced temperature achieve a higher purity of the net gas than either elevated pressure or reduced temperature alone.

In hydrocarbon conversion processes employing two or more reactors, arrangements for regenerating the hydrocarbon conversion catalyst in situ semicontinuously are well known. In semi-continuous regeneration, all of the reactors are periodically taken out of service and are regenerated by passing the oxygen-containing gas through the reactors in series. The oxygen-containing gas passes from one reactor to the next reactor through the heaters, heat exchangers, and conduits through which the hydrocarbon-feed stream passes when hydrocarbon conversion takes place. Coke combustion is controlled by recycling the oxygen-containing gas, by adding a small stream of make-up air to replace oxygen consumed in the combustion of coke, and by venting off a small amount of flue gas containing the by-products of coke combustion to allow for the addition of the make-up air. While coke burning progresses from one reactor to the next reactor, the steady addition of make-up gas and the venting of flue gas establishes a steady state condition that produces a nearly constant concentration of water in the circulating regeneration gases. This steady state concentration of water in the circulating gases is higher where, in addition, the circulating regeneration gases are contacted with and then separated from an aqueous solution. One example in the prior art of the desirability of contacting the circulating gases with an aqueous solution arises where the circulating regeneration gases contain a halogen-containing compound such as hydrogen chloride and the regeneration gases are contacted with a basic, aqueous solution in order to neutralize the hydrogen chloride. The concentration of water in the circulating gases is generally higher when there is contacting with an aqueous solution than when there is not contacting. This is because the water concentration of the regeneration gases, after having been separated from the aqueous solution, is the saturation concentration of water at the conditions of the separation, which is generally much higher than the steady state concentration arising from the water of coke combustion alone.

One problem associated with coke combustion is catalyst deactivation. The combination of temperature, water vapor, and exposure time determines the useful life of the catalyst. Exposure of high surface area catalyst to high temperatures for prolonged periods of time will create an amorphous material having a reduced surface area which in turn lowers the activity of the catalyst. In contrast to catalyst deactivation by coke deposition, deactivation of this type is permanent, rendering the catalyst unusable. When moisture is present—water is a by-product of the coke combustion—the deactivating effects of high temperature exposure are compounded.

Various methods have been proposed in the prior art for reducing the water present during regeneration of catalysts, but these methods require the use of expensive additional drying equipment, such as large beds of desiccant. These beds of desiccant are expensive both to construct and to operate, because of the relatively large volumetric flow rate of circulating recycle gas flowing through the beds, because of the water that is present as a result of contacting the regeneration gases with an aqueous solution, and because of the water that is produced as a by-product of coke combustion. Also, during typical in-situ regenerations of the prior art, the net gas compressor and the net gas chiller, where present, generally sit idle and are not employed in reducing the water present during regeneration.

Therefore, there is a need for a method for reducing the water content during the regeneration of a catalyst in a hydrocarbon conversion unit that does not require the use of additional expensive equipment and maximizes the use of existing process equipment.

SUMMARY OF THE INVENTION

The present invention reduces the steady state concentration of water in the circulating regeneration gases that is established during regeneration. Whether the source of the water in the regeneration gases is from coke burning or from contacting the regeneration gases with an aqueous solution is immaterial. In any event, the present invention removes water in the circulating regeneration gases using the net gas purification equipment of the hydrocarbon process.

This invention employs the net gas purification equipment that would otherwise sit idle during regeneration of a hydrocarbon conversion catalyst because no net gas is produced while no hydrocarbon conversion reactions are occurring. In this invention, the net gas purification equipment is used during regeneration in a manner that removes water from the circulating oxygen-containing stream that enters the bed of catalyst, thereby reducing the risk of permanent deterioration of surface area of the catalyst. According to this invention, no additional drying equipment is necessary to remove the water.

This invention is useful for the regeneration of a catalyst used in catalytic hydrocarbon conversion processes that produces a net gas stream comprising hydrogen and light hydrocarbons and that employs a net gas compressor or a net gas cooler or chiller, or both, and where the hydrocarbon conversion catalyst is susceptible to permanent deactivation due at least in part to high water concentrations during regeneration. According to this invention, the net gas compressor, the net gas cooler or chiller, or both may be used during the regeneration of the catalyst.

It is an objective of this invention to regenerate a catalyst in a hydrocarbon conversion unit that is deactivated by coke deposits using a procedure that minimizes contact of the catalyst with water. It is a further objective of this invention to regenerate a catalyst in a hydrocarbon conversion unit using a procedure that maximizes the use of existing equipment and minimizes the need for additional equipment that is used during regeneration only and that sits idle the rest of the time.

In a broad embodiment, this invention is a method of converting a hydrocarbon feed with a catalyst and regenerating the catalyst by contact with an oxygen-containing stream. A feed stream comprising hydrocarbons is contacted with a hydrocarbon conversion catalyst at hydrocarbon conversion conditions. An effluent stream comprising hydrogen, light hydrocarbons, and heavy hydrocarbons is withdrawn from the catalyst and passed to a separation zone. A first process gas stream comprising hydrogen and the light hydrocarbons and a first process liquid stream comprising the heavy hydrocarbons are recovered from the separation zone. The first process gas stream is passed to a purification zone. A second process gas stream comprising hydrogen and a second process liquid stream comprising said light hydrocarbons are recovered from the purification zone. The contacting of the catalyst with the feed stream is discontinued. The catalyst is contacted with a regeneration stream comprising an inert compound and oxygen and a first flue gas stream comprising the inert compound and water is produced. The first flue gas stream is passed to the separation zone. A second flue gas stream comprising the inert compound and water is recovered from the separation zone. The second flue gas stream has a first concentration of water. A first waste liquid stream comprising water is also recovered from the separation zone. The second flue gas stream is passed to the purification zone. A third flue gas stream is withdrawn from the purification zone. The third flue gas stream has a second concentration of water that is less than the first concentration. A second waste liquid stream comprising water is also recovered from the separation zone. At least a portion of the third flue gas stream is recovered as the regeneration stream.

Additional objectives and embodiments of this invention are described in the detailed description of the invention.

INFORMATION DISCLOSURE

U.S. Pat. No. 2,845,409 (Pennington et al.) shows a catalyst regeneration process that employs a quench zone and a drying zone.

U.S. Pat. No. 3,046,235 (King et al.) shows a catalyst regeneration process that employs a flue gas cooler, a scrubber tower and a drier.

BRIEF DESCRIPTION OF THE DRAWING

The drawing is a simplified flow diagram of a catalytic reforming process having heaters and reactors in a series-flow arrangement of this invention.

DETAILED DESCRIPTION OF THE INVENTION

To reiterate, the present invention is a method of regenerating a hydrocarbon-conversion catalyst that employs equipment that is used during hydrocarbon processing for purifying a net gas stream and that normally sits idle during catalyst regeneration. This net gas purification equipment can be used to raise the pressure, to lower the temperature, or to both raise the pressure and lower the temperature of the circulating regeneration gases and thereby remove more water from the circulating regeneration gases than would otherwise be removed without the use of additional equipment.

The amount of water released during regeneration of a hydrocarbon-conversion catalyst depends on the hydrogen content of the coke. Coke is comprised primarily of carbon, but is also comprised of a relatively small quantity of hydrogen. On an overall basis, hydrogen generally comprises between about 0.5–10 percent of the overall weight of coke. Although the amount of water generated as a by-product of coke combustion may be relatively minor compared to the amount of carbon dioxide or the amount of the circulating regeneration gases, it has been discovered that the removal of moisture from the regeneration gases during regeneration will produce geometric increases in the life of a typical reforming catalyst. This is also true for catalysts selective for dehydrocyclization of paraffins, such as the reforming catalyst described hereinafter.

Moreover, the amount of water present during regeneration of a hydrocarbonconversion catalyst also depends on whether the circulating regeneration gases are contacted with an aqueous solution. It may be desirable or necessary to contact the regeneration gases with a basic aqueous solution when the regeneration gases contain an acidic halogen-containing compound, in order to neutralize the acidic compound. After this contacting and neutralization is performed, the aqueous solution is separated from the regeneration gases. Consequently, the neutralized regeneration gases have a concentration of water equal to the saturation concentration of water at the conditions of the separation, which is generally significantly greater than the concentration of water due solely to the combustion of coke.

The conversion system of the present invention is an integrated processing unit which includes equipment, catalyst, sorbents and chemicals used in the processing of a hereinafter-defined hydrocarbon feedstock. The equipment includes reactors, reactor internals for distributing feed and containing catalyst, other vessels, heaters, heat exchangers, conduits, valves, pumps, compressors and associated components known to those of ordinary skill in the art. Preferably, the conversion system is a catalytic-reforming system.

The conversion system comprises either a fixed-bed reactor or a moving-bed reactor whereby catalyst may be continuously withdrawn and added. One fixed-bed reactor system known to those of ordinary skill in the art is a semi-regenerative unit, which maintains operating severity by increasing reactor temperature, and which is eventually shut down for catalyst regeneration and reactivation. The preferred embodiment of the present invention is multiple fixed-bed reactors in a semi-regenerative unit.

The feed to the conversion system may contact the respective particulate beds of catalyst in the reactors in either up-flow, down-flow, or radial-flow mode. Since the preferred dehydrocyclization reaction of the reforming system is favored by relatively low pressure, the low pressure drop in a radial-flow reactor favors the radial-flow mode.

The hydrocarbon feed comprises paraffins and naphthenes and may comprise olefins and mono- and polycyclic aromatics. The preferred feed boils within the gasoline range and may comprise gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 150°–210° C., or it may represent a narrower range within these broad ranges. For the reforming catalyst described hereinafter, paraffinic stocks, such as naphthas from Middle East crudes, are especially preferred hydrocarbon feeds due to the ability of the process to dehydrocyclize paraffins to aromatics. Raffinates from aromatics extraction, containing principally low-value $C_6$–$C_8$ paraffins which can be converted to valuable B-T-X aromatics, are especially preferred.

Preferably, the hydrocarbon feed is substantially contaminant-free. Substantially contaminant-free is defined as a level of contaminant that, in the hydrocarbon feed, would not cause a shut down of the conversion system due to the deactivation of the catalyst within a three-month period of operation. More preferably, the level of contaminant will be below detectable levels, by test methods known in the art. The hydrocarbon feed preferably has been treated by conventional methods such as hydrotreating, hydrorefining or hydrodesulfurization to convert sulfurous, nitrogenous and oxygenated compounds to $H_2S$, $NH_3$ and $H_2O$, respectively, which can be separated from the hydrocarbons by fractionation. This conversion that removes contaminants preferably will employ a catalyst known to the art comprising an inorganic oxide support and metals selected from Groups VIB (6) and VIII (9–10) of the Periodic Table. [See Cotton and Wilkinson, Advanced Organic Chemistry, John Wiley & Sons (Fifth Edition, 1988)]. Alternatively or in addition to the conversion step, the feed may be contacted with sorbents capable of removing sulfurous and other contaminants. These sorbents may include but are not limited to zinc oxide, nickel-alumina, nickel-clay, iron sponge, high-surface-area sodium, high-surface-area alumina, activated carbons, molecular sieves, and manganese oxide, especially a manganous oxide.

The catalyst is loaded into the conversion system after contaminants have been purged and the system is substantially contaminant-free. A method of purging the system of contaminants such as sulfur is described in U.S. Pat. No. 5,035,792 (Foutsitzis) which is incorporated herein.

The catalyst contacts the hydrocarbon feed at hydrocarbon-conversion conditions. Hydrocarbon-conversion conditions comprise a pressure of from about atmospheric to 150 atmospheres (abs), a temperature of from about 200°–600° C., and a liquid hourly space velocity relative to the catalyst of from about 0.2 to 10 $hr^{-1}$. Preferably the system is a sulfur-free catalytic-reforming system and the conditions comprise reforming conditions including a pressure of from about atmospheric to 60 atmospheres (abs). More preferably the pressure is from atmospheric to 20 atmospheres (abs), and excellent results have been obtained at operating pressures of less than 10 atmospheres. The hydrogen to hydrocarbon mole ratio is from about 0.1 to 10 moles of hydrogen per mole of hydrocarbon feed. Space velocity with respect to the volume of catalyst is from about 0.5 to 10 hr–1. Operating temperature is from about 400°–560° C. Since the predominant reaction of the preferred embodiment is the dehydrocyclization of paraffins to aromatics, the catalyst will preferably be contained in two or more reactors with interheating between reactors to compensate for the endothermic heat of reaction and maintain suitable temperatures for dehydrocyclization.

The catalyst used in hydrocarbon conversion comprises one or more metal components on a refractory support. The metal component will comprise one or more from Groups IA (1), IIA (2), IVA (4), VIA (6), VIIA (7), VIII (8–10), IIIB (13) or IVB (14) of the Periodic Table. Applicable refractory supports are as described hereinafter. The catalyst also may contain a halogen component, phosphorus component, or sulfur component.

The catalyst preferably is a reforming catalyst, containing a non-acidic L-zeolite and a platinum-group metal component, which is highly sulfur-sensitive. It is essential that the L-zeolite be non-acidic, as acidity in the zeolite lowers the selectivity to aromatics of the finished catalyst. In order to be "non-acidic," the zeolite has substantially all of its cationic exchange sites occupied by nonhydrogen species. More preferably the cations occupying the exchangeable cation sites will comprise one or more of the alkali metals, although other cationic species may be present. An especially preferred nonacidic L-zeolite is potassium-form L-zeolite.

It is necessary to composite the L-zeolite with a binder in order to provide a convenient form for use in the catalyst of the present invention. The art teaches that any refractory inorganic oxide binder is suitable. One or more of silica, alumina or magnesia are preferred binder materials of the reforming catalyst. The L-zeolite and binder may be composited to form the desired catalyst shape by any method known in the art.

A platinum-group metal component is another essential feature of the reforming catalyst, with a platinum component being preferred. It is within the scope of the present invention that the catalyst may contain other metal components known to modify the effect of the preferred platinum component. Such metal modifiers may include Group IVA (14) metals, other Group VIII (8–10) metals, rhenium, indium, gallium, zinc, uranium, dysprosium, thallium and mixtures thereof. Catalytically effective amounts of such metal modifiers may be incorporated into the catalyst by any means known in the art.

Further details of the preparation and activation of embodiments of the sulfursensitive reforming catalyst are disclosed, e.g., in U.S. Pat. No. 4,619,906 (Lambert et al), U.S. Pat. No. 4,822,762 (Ellig et al.) and U.S. Pat. No. 5,035,792 (Foutsitzis), which are incorporated into this specification by reference thereto.

The detailed description of the drawing that follows consists of two parts. First, the conversion of hydrocarbons in the process is described. This processing of hydrocarbons results in the deactivation of the catalyst in the reactors with carbon. It may also result in the contamination of heaters and heat exchangers with sulfur. Second, the regeneration of the catalyst is described. The drawing is a simplified flow diagram of a catalytic reforming process in which are shown only those lines and other equipment necessary to illustrate one embodiment of the present invention. In locations where a single valve is shown in the drawing, it is known to those of ordinary skill in the art of hydrocarbon processing that other means for stopping or regulating flow through lines may be used, such as a blind, two valves, two valves separated by a conduit having a valved vent or bleed, pneumatically- or electronically-operated valves, etc.

Referring to the drawing, a hydrocarbon feed stream comprising $C_6$–$C_{10}$ hydrocarbons and sulfur contaminants enters the process through line 10. The hydrocarbon feed stream combines with a recycle stream comprising hydrogen from line 83 to form a combined feed stream in line 12. During hydrocarbon processing, valve 14 is open and valve 22 is closed. The combined feed stream passes through lines 16 and 18 and enters the combined feed heat exchanger 26. The combined feed heat exchanger 26 is a shell-and-tube type heat exchanger wherein the combined feed stream flows through the inside of the tubes 17 and the effluent from the third reactor 56 flows via line 58 through the shell of the exchanger around the outside of the tubes 17. In the combined feed heat exchanger 26 the combined feed is heated from about 100° F. (38° C.) to about 650° F. (343° C.) by exchanging heat with the effluent stream leaving the third reactor 56. The heated combined feed stream passes through the line 28 to the charge heater 30. The charge heater 30 is an indirect fired heater wherein the heated combined feed stream flows through the inside of tubes 32, a fuel gas or fuel oil burns in the heater firebox outside the tubes 32, and the combined feed stream is heated by indirect heat transfer through the tubes 32. The temperature of the combined feed leaving the charge heater 30 in the line 34 is between about 900° F. (482° C.) and about 1000° F. (538° C.).

The hot combined feed in line 34 enters the first reactor 36 of three reactors in series (36, 46 and 56) that each contain reforming catalyst. In each reactor, dehydrocyclization reactions take place and the net effect of all the reactions that take place in each reactor is generally endothermic. Consequently, the effluent stream from the first reactor 36 passes through the first interheater 40, which is an indirect fired heater and which reheats the effluent stream in line 38 to reforming temperature. The effluent from the first interheater 40 passes through the line 44 to the second reactor 46, where additional dehydrocyclization reactions occur. The effluent of the second reactor 46 passes through the line 48 to the second interheater 50 which is an indirect fired heater. The effluent from the second interheater 50 passes through the line 54 to the third reactor 56. The effluent from the third reactor comprises hydrogen, light hydrocarbons (e.g., $C_1$–$C_4$), and heavy hydrocarbons. The effluent from the third reactor 56 passes through the line 58 to the shell-side of the combined feed exchanger 26, wherein heat is transferred from the effluent stream to the combined feed stream.

After cooling in the combined feed exchanger 26, the reactor effluent stream passes through the line 60. During hydrocarbon processing, valve 109 is closed and valve 64 is open. Therefore, the effluent stream passes through the line 62, the valve 64, and the lines 66 and 68. Valve 142 is closed, and so the effluent stream passes through line 70 to the cooler 72, where the effluent stream is further cooled by cooling water as shown, or by ambient air to about 100° F. (38° C.). The cooled effluent flows through the line 74 to the gas-liquid separator 76. The liquid, heavier hydrocarbons in the reactor effluent stream exit the separator 76 through the line 108. During hydrocarbon processing, valve 116 is closed and valve 110 is open, and so the liquid hydrocarbons pass through the line 112 to downstream separation facilities, such as fractionation columns which are not shown.

The hydrogen and light hydrocarbons in the reactor effluent stream leave the separator 76 as a gas stream through the line 75. During hydrocarbon processing, valve 80 is open and valve 102 is closed, and so the total gas stream passing through line 75 splits into two portions—a recycle gas stream that passes through line 78 and a net or excess gas stream that passes through line 77. The portion of the gas leaving the separator 76 that becomes the recycle gas stream is recycled to the reactors as recycle gas through the line 78, valve 80, and line 81 to the suction of the recycle compressor 82. From the discharge of the recycle compressor 82, the recycle gas flows through the line 83 to combine with the hydrocarbon feed entering the process via line 10.

A portion of the gas leaving the separator 76 comprises the net or excess gas from the reforming reactions and passes through the lines 77 and 79 to the suction of the net gas compressor 84. Although the drawing shows the net gas compressor 84 as only a single stage of net gas compression, where a high discharge pressure is desired it may be either preferable or more economical to employ more than one stage (e.g., two or three stages) of compression. Where multiple stages of net gas compression are employed, interstage cooling may be employed to remove the heat of compression and interstage separators may be employed to remove condensed hydrocarbons. From the discharge of the net gas compressor 84, the gas flows through line 85 to a cooler 86, where the effluent stream is cooled to between −10° F. and 150° F. (−23° C. and 66° C.) using cooling water or a refrigerant, depending on the desired temperature. More of the light hydrocarbons that are present in the gas stream flowing through the line 85 are condensed in the cooler 86 when the operating pressure of the cooler 86 is higher or when the operating temperature of the cooler 86 is lower. The cooled effluent flows through the line 87 to the gas-liquid separator 90. The condensed, light hydrocarbons in the cooler effluent stream exit the separator 90 as a liquid through the line 88. During hydrocarbon processing, valve 93 is closed and valve 92 is open, and so the liquid hydrocarbons pass through the line 94 to downstream separation facilities, such as fractionation columns which are not shown. Hydrogen and other uncondensed light hydrocarbons in the cooler effluent stream exit the separator 90 via the line 95. During hydrocarbon processing, valve 100 is closed and valve 98 is open, and so the net gas stream flows through valve 98 and the line 99 to downstream facilities, such as gas compression for use in other process units.

The description in the preceding paragraph of the operation of the compressor 84, cooler 86, and separator 90 is an illustration of one flow scheme for a purification zone for recovering light hydrocarbons from, and increasing the hydrogen purity of, the net gas of a catalytic reforming unit. It is not intended for this description to limit the scope of the present invention as claimed. Instead, this description is intended to point out three important steps used in the processing of the net gas streams of many commercial catalytic reforming processes, namely compression, cooling, and separation. Other flow schemes for processing the net gas stream that are suitable for use in the present invention include the processes described in U.S. Pat. Nos. 4,333,819 and 4,568,451, which are incorporated herein.

After an appropriate processing period, the catalyst in the reactors 36, 46 and 56 becomes deactivated by the deposition of coke. Coke is comprised primarily of carbon but is also comprised of a relatively small quantity of hydrogen. In order to remove the coke from the catalyst in a semi-regenerative process as shown in the drawing, the catalyst is contacted in situ with an oxygen-containing gas stream. Prior to the introduction of oxygen into the process, the reactor circuit, which includes the reactors, heaters, combined feed heat exchanger, separator, recycle compressor, and interconnecting conduits, and the net gas circuit, which includes the net gas compressor, chiller, separator, and interconnecting conduits, are freed of hydrogen and hydrocarbons by steps known to those skilled in the art of catalytic hydrocarbon processing. These steps may include discontinuing the introduction of hydrocarbon, isolating the reactor circuit and the net gas circuit from other process equipment, stopping the recycle gas compressor and net gas compressor, depressuring the reactor circuit and net gas circuit to atmospheric pressure, draining liquid hydrocarbons, evacuating the reactor circuit and net gas circuit to sub-atmospheric pressure, and purging with an inert gas such as nitrogen. Once the reactor and net gas circuits are freed of hydrogen and hydrocarbon, the positions of the valves in the reactor and net gas circuits are changed in preparation for regeneration: valves 14, 64, 80, 92, 98, and 110 are closed and valves 22, 100, and 109 are opened.

The reactor is pressurized with nitrogen through line 106 by opening valve 104, and the net gas compressor 84 is restarted. The flow of the recirculating nitrogen is as follows. Nitrogen flows from the discharge of the net gas compressor 84, through line 85, cooler 86, and line 87, and into separator 90. Nitrogen exits separator 90 via line 95, and flows through line 95, valve 100, line 101, and line 108. Nitrogen flows through pressure-reducing valve 109, which reduces the pressure of the flowing nitrogen from the relatively-high pressure associated with the discharge of the net gas compressor 84 to the relatively-low pressure associated with the reactors 36, 46, and 56. By relatively-high pressure, it is meant that the nitrogen pressure upstream of pressure-reducing valve 109 is between 25 psig and 3000 psig, and more commonly between 75 psig and 500 psig. By relatively-low pressure, it is meant that the nitrogen pressure downstream of pressure-reducing valve 109 is between atmospheric pressure and 300 psig, and more commonly between 25 psig and 75 psig. From the pressure-reducing valve 109, nitrogen flows through lines 100 and 60 to the effluent side of the combined-feed exchanger 26. Because the nitrogen flows on the effluent side of the tubes 17 in the combined feed exchanger 26 the nitrogen does not contact any sulfur that may have deposited on the feed side of the tubes 17. Nitrogen then flows through the reactor circuit in a direction opposite to the flow of hydrocarbons during normal operation. Nitrogen flows through line 58, reactor 56, line 54, and tubes 52 of heater 50. From heater 50, nitrogen flows through line 48, reactor 46, line 44, tubes 42 of heater 40, line 38, reactor 36, and to line 34. The nitrogen then contacts, in the order of the nitrogen flow, tubes 32 of heater 30, line 28, and the feed-side of tubes 17 of combined-feed exchanger 26. From the combined feed exchanger 26, the nitrogen flows through the lines 18 and 20, valve 22, lines 24 and 68, line 70, cooler 72, line 74, and to the separator 76. The nitrogen leaves the separator 76 through the lines 75, 77, and 79, and returns to the suction of the net gas compressor 84.

Once this recirculating nitrogen flow is established, a caustic solution of water and sodium hydroxide is introduced through line 128 and valve 126 in order to establish an inventory of the caustic solution in the separator 76. Valves 116 and 142 are opened, and the pump 138 is started. The caustic solution recirculates from the discharge of pump 138, through line 140, valve 142, lines 144 and 70, the cooler 72, line 74, and to separator 76. From the separator 76, the caustic solution flows back to the pump 138 through lines 108 and 114, valve 116, and lines 118, 124, 130, and 136. At the junction of lines 144, 68 and 70, the recirculating caustic solution in line 144 contacts the recirculating nitrogen in line 68. This contacting of liquid and gas continues in lines 70, cooler 72, and line 74 and until the liquid caustic solution and the nitrogen gas separate in the separator 76. Because the circulating gas comprises only nitrogen at this stage, the circulating caustic solution does not wash or scrub any halogens or halogen-containing compounds or any sulfur oxides from the circulating gas. At this stage, the circulation of the caustic solution is established only in anticipation of the next steps of the regeneration, namely, heating the recirculating nitrogen gas and introducing air.

The circulating nitrogen gas is heated by the three heaters, 30, 40, and 50, and by the combined feed exchanger 26. Once the heaters are started, heater 50 heats the gas entering reactor 46 via line 48 to the desired temperature and heater 40 heats the gas entering reactor 36 via line 38 to the desired temperature. Heater 30 heats the gas entering combined feed exchanger 26 via line 28 to a sufficient temperature so that, when the gas in line 28 transfers heat to the gas in line 60 through the tubes 17 of exchanger 26, the gas entering reactor 56 via line 58 is heated to the desired temperature.

After the reactors are at the desired temperature, air is introduced into the circulating nitrogen gas through line 55 by opening valve 57. Compressed, ambient air is a suitable source of air to line 55. Preferably, but not necessarily, the air is dried so that the concentration of water is less than 5 v-ppm. The air is introduced until the concentration of oxygen in the gas entering reactor 56 via line 58, as measured by an oxygen analyzer, is preferably between 0.5–0.9 mol-%. If the catalyst comprises a halogen or a platinum-group metal component, a halogen or halogen-containing compound may also be introduced into line 58 by means not shown. In the presence of oxygen, the coke on the catalyst in reactor 56 begins to burn. Generally, most of the oxygen that enters reactor 56 is consumed in the combustion of the coke, so that until most of the coke is burned in reactor 56, the concentration of oxygen in the flue gas leaving reactor 56 via line 54 is low, generally less than 0.2 mol-%. This flue gas circulates through the other reactors, heaters, and equipment, following the same route as that described previously for nitrogen and ultimately reaching line 77. A portion of the recirculating flue gas is vented through valve 102 and line 103 at a rate roughly equal to the rate of introduction of air through line 55. In this manner, the pressure of the circulating regeneration gases, and the concentration of oxygen in the gas stream entering reactor 56 via line 58, are maintained at steady-state conditions.

As described in the preceding paragraph, while coke is burning in reactor 56, the concentration of oxygen in the gas leaving reactor 56 via line 54 is generally low. Therefore, the burning of coke in reactor 46 generally does not begin until most of the burning of coke in reactor 56 is completed and higher concentrations of oxygen are present in the gas in line 48. Then, the coke burning proceeds through reactor 46, during which burning the oxygen concentration in line 44 is generally low and little combustion occurs in reactor 36. When burning of coke in reactor 46 is nearly completed, burning of coke in reactor 36 proceeds, in a manner similar to that of reactor 46 and 56. Therefore, the gas stream in line 34 leaving reactor 36 has a low concentration of oxygen until most of the coke is burned in all three reactors 56, 46, and 36.

The progression of the coke burning through reactors 56, 46, and 36, as described in the preceding paragraph, is referred to herein a "reverse-series burn" because the burning progresses through the reactors in a sequential or series manner and in a direction opposite to the flow of hydrocarbons during normal operation. In a "reverse-series burn," the oxygen for coke-burning is introduced into the circulating regeneration gases at only one location, namely at a convenient, accessible location near to the location where the regeneration gases enter the initial reactor of a series of reactors. In the drawing, the initial reactor in the series of reactors is reactor 56, and air for a "reverse-series burn" is introduced at the junction of lines 55 and 58. An alternative to a "reverse-series burn" is what is referred to herein as a "reverse-parallel burn." In a "reverse-parallel burn," the oxygen for coke burning is introduced simultaneously into the circulating regeneration gases at more than one location, and commonly two locations. One of the locations for introducing oxygen for coke burning in a "reverse-parallel burn" is the same location as that used for a "reverse-series burn." Where only one other location is used, the second location is a convenient, accessible location near to where the regeneration gases have passed serially through about the first one-half of the catalyst in all the reactors, as computed from the location where the regeneration gases enter the initial reactor of a series of reactors. In the drawing, and presuming that 20% of the total catalyst in all the reactors is in reactor 36, 30% is in reactor 46, and 50% is in reactor 56, then the second location for introducing air for a "reverse-parallel burn" is at the junction of lines 45 and 48. Thus, for a "reverse-parallel burn," air is introduced into the circulating nitrogen gas not only through line 55 by opening valve 57, but simultaneously through line 45 by opening valve 47. During a "reverse-parallel burn," if the catalyst comprises a halogen or a platinum-group metal, a halogen or halogen-containing compound may also be introduced into line 48 by means not shown. The advantage of a "reverse-parallel burn" is roughly a reduction by 50% in the elapsed time for burning coke from the catalyst. This is because the coke on the second one-half of the catalyst (reactors 46 and 36) begins to burn at the same time, rather than after, the coke on the first one-half of the catalyst (reactor 56) burns. In a "reverse-parallel burn," as in a "reverse-series burn," the gas stream in line 34 leaving reactor 36 generally has a low concentration of oxygen until most of the coke is burned in all three reactors 56, 46, and 36.

While coke is burning in the reactors, the amount of heat transfer required of the heaters 30, 40, and 50, and of the combined feed exchanger 26 may change dramatically from the situation described previously for the heating of the circulating nitrogen gas prior to the introduction of air. Because the combustion of coke is exothermic, the temperature of the regeneration gases leaving a reactor in which coke is burning may be significantly higher than the temperature of the regeneration gases entering a reactor. In such circumstances, a heater through which regeneration gases leaving a reactor pass may not be needed at all for heating the gases prior to their entry into the next reactor. In fact, where cooling is required, with an appropriate reduction in the rate of firing and a properly-adjusted draft, a fuel-fired radiant or convective heater may be usefully employed to cool the regeneration gases leaving a reactor to a lower, desired temperature for the regeneration gases entering the next reactor. Thus, during catalyst regeneration, the heaters 50 and 40 may at times not be required for their heating function per se, although they still perform a necessary function as a kind of a conduit for routing the regeneration gases from reactor 56 to reactor 46 and from reactor 46 to reactor 36, respectively. Similarly, at times during the combustion of coke in reactor 36 where the regeneration gases in line 34 are sufficiently hot, the heater 30 may not be required for heating the regeneration gases in line 34. In other words, provided that the temperature of the regeneration gases in line 34 is sufficiently high, the heat transfer capability of exchanger 26 is sufficiently large, and the desired inlet temperature for the regeneration gases entering reactor 56 via line 58 is sufficiently low, then at some times the necessary amount of heat transfer via exchanger 26 to achieve the desired temperature for the regeneration gases entering reactor 56 via line 58 may be attainable without the need for additional heating by heater 30. It is believed, however, that in a commercial reforming process the duration and benefit of this result would be outweighed by the expense of the combined feed exchanger that would be necessary to achieve the result.

During this coke burning, whenever some oxygen is present in the gas leaving reactor 36 via line 34, there is a possibility that some sulfur-containing deposits on the inner surfaces of reactor 36, line 34, tubes 32, line 28, and tubes 17 to be converted to sulfur oxide. These sulfur-containing deposits may have been formed during hydrocarbon processing of a sulfur-containing feedstock. By "sulfur oxide" it is meant a gaseous compound comprising sulfur and oxygen, such as, but not limited to, sulfur dioxide and sulfur trioxide. It is known that sulfur dioxide and sulfur trioxide generally form, although to different extents, when oxygen contacts sulfur-containing deposits on hydrocarbon conversion processes at coke-burning conditions. Although the concentration of the sulfur oxides present in the gas that ultimately exits the combined feed exchanger 17 via line 18 is relatively low while the concentration of oxygen is low, this concentration increases as the concentration of oxygen in the gas leaving reactor 36 via line 34 increases and more oxygen is available to react with the sulfur deposits. Where the catalyst comprises a halogen, or where halogen is injected during the carbon burning step or subsequently during the oxidation step, the circulating gases may also contain a halogen or a halogen-containing compound.

Sulfur oxide that is formed either in line 34, tubes 32, line 28, or tubes 17, along with any halogen, ultimately appears in the circulating regeneration gas flowing through line 18. As described previously, this gas flows through lines 20, 24, and 68. At the junction of lines 68 and line 144, the gas contacts a stream of caustic solution flowing through line 144. By caustic solution, it is meant an aqueous solution of a base comprising a Group IA (1) or Group IIA (2) element, such as sodium, potassium, and calcium, including sodium hydroxide as described previously, and also including potassium hydroxide and calcium hydroxide. The Group IA (1) or Group IIA (2) base reacts with the sulfur oxide and the halogen-containing compounds, thereby removing them from the circulating gases. Intimate mixing of the caustic solution and the regeneration gas stream at the junction of lines 68 and 144, and in line 70 is advantageous to promote the reaction and removal of the sodium oxide from the gas stream. Those skilled in the art of gas-liquid contacting are able to design suitable liquid and gas distributors and mixing devices to ensure intimate contacting of the liquid and gas streams and promote the removal of sulfur oxide and halogen-containing compounds from the gas stream. As described previously, the caustic solution is separated from the gas stream in the separator 76, as described previously, and is recirculated to line 144 by pump 138.

In order to help ensure removal of the sulfur oxide and halogen-containing compounds from the gas stream, an adequate concentration of Group IA (1) or IIA (2) element that has not yet reacted with sulfur oxide must be maintained in the circulating caustic stream. Preferably, the molar ratio of such unreacted Group IA (1) or IIA (2) in the circulating caustic stream in line 144 to sodium oxide and halogen-containing compounds in the circulating nitrogen stream in line 68 is greater than one. For the concentrations of sulfur oxide and halogen-containing compounds expected in the circulating regeneration gases in line 68, and where the caustic solution is sodium hydroxide and water, the caustic solution generally has a total alkalinity of 1.5–2.0 wt-% NaOH equivalents or more, a pH of 7–8, and a solids concentration below 6–7 wt-% to avoid foaming. In order to maintain the desired steady state concentration of the caustic solution in the stream 144, a portion of the circulating stream of caustic solution is at least intermittently withdrawn by opening valve 120, withdrawing the caustic solution through line 122, and routing the caustic solution to disposal. To compensate for the caustic solution that is withdrawn, fresh, make-up caustic solution is added at least intermittently through line 128 by opening valve 126. If necessary to control the concentration or volume of the circulating caustic solution, fresh water may be added through line 134 by opening valve 132. The concentration of the circulating caustic solution can be measured by sampling and using known analytical methods.

After being contacted with the caustic solution and separated from the caustic solution in the separator 76, the regeneration gases exit the separator through line 75. The water content regeneration gases in line 75 is generally the saturation water content of the gases at the conditions of the separator 76. Although a bed of desiccant could be installed in line 75 to reduce the water content of the gases flowing in line 75, the expense to build and operate a desiccant bed that would remove a large fraction of the water in the gas stream would be uneconomical. In accord with this invention, the size of a desiccant bed for removing water, if such a bed is needed at all, can be significantly reduced by first removing water from the regeneration gases in line 75 using the equipment in the net gas purification section to reduce the water content. As described previously, during the regeneration of the catalyst in a semi-regenerative reforming process, the net gas compression section sits idle because no net gas is produced. In this invention, this idle equipment is put to use in removing water from the regeneration gases in line 75 by compression, cooling, and separation.

Referring again to the drawing, in a preferred embodiment as described in the preceding paragraph, the regeneration gases in line 75, except for the portion that is vented through valve 102 and line 103, pass through line 77 and 79 to the suction of the net gas compressor 84. From the discharge of the net gas compressor 84, the gases pass through the line 85, the cooler 86, the line 87, and to the separator 90. The net gas compressor 84 and the net gas cooler 86 are operated at conditions sufficient to achieve in the separator 90 a pressure of between 25 psig and 3000 psig, and more commonly between 75 psig and 500 psig, and temperature of between 32° F. and 150° F., and more commonly between 35° F. and 60° F. Consequently, the water content of the regeneration gases leaving separator 90 via line 95 is generally less than 10 mol-%, preferably less than 500 mol-ppm, and more preferably less than 50 mol-ppm.

The regeneration gases in line 95 flow through line 96, valve 100, and lines 101 and 108. For the removal of additional water, if desired, a desiccant bed in a location along line 108 may be used, and a desiccant bed in a location along line 108 would be significantly smaller in both size and cost than a desiccant bed located in line 75, as described previously. Those skilled in the art of hydrocarbon processing are able to choose a suitable desiccant, such as molecular sieve, and to design and operate a desiccant bed system. From line 108, the regeneration gases flow through pressure-reducing valve 109, line 100, line 60, exchanger, line 58 and to reactor 56.

Following the combustion of the coke deposits, the temperature and oxygen concentration of the recirculating gases are generally increased in preparation for oxidation, the next step of the catalyst regeneration. The reforming catalyst generally will be oxidized at a temperature of about 300° to 550° C. (preferably about 350° C.) in an air atmosphere for 0.5 to 10 hours. As during the coke burning step, and in accord with this invention to help reduce the water content of the circulating regeneration gases, the regeneration gases may continue to be circulated through the net gas section during the oxidation step. Preferably the oxidized catalyst is subjected to a substantially water-free reduction step at a temperature of about 300° to 550° C. (preferably about 350° C.) for 0.5 to 10 hours or more. The duration of the reduction step should be only as long as necessary to reduce the platinum, in order to avoid pre-deactivation of the catalyst, and may be performed in-situ as part of the plant start-up if a dry atmosphere is maintained.

What is claimed is:

1. A method of converting a hydrocarbon feed with a catalyst and regenerating the catalyst by contact with an oxygen-containing stream, said method comprising:
   (a) contacting a feed stream comprising hydrocarbons with a hydrocarbon conversion catalyst at hydrocarbon conversion conditions; withdrawing from said catalyst an effluent stream comprising hydrogen, light hydrocarbons, and heavy hydrocarbons; passing said effluent stream to a separation zone; recovering from said separation zone a first process gas stream comprising hydrogen and said light hydrocarbons and a first process liquid stream comprising said heavy hydrocarbons; passing said first process gas stream to a purification zone; and recovering from said purification zone a second process gas stream comprising hydrogen and a second process liquid stream comprising said light hydrocarbons;
   (b) discontinuing the contacting of said catalyst with said feed stream;
   (c) contacting said catalyst with a regeneration stream comprising an inert compound and oxygen and producing a first flue gas stream comprising said inert compound and water;
   (d) passing said first flue gas stream to said separation zone, and recovering from said separation zone a second flue gas stream comprising said inert compound and having a first concentration of water and a first waste liquid stream comprising water;
   (e) passing said second flue gas stream to said purification zone, and withdrawing therefrom a third flue gas stream having a second concentration of water that is less than said first concentration and a second waste liquid stream comprising water; and
   (f) recovering at least a portion of said third flue gas stream as said regeneration stream.

2. The method of claim 1 wherein said first flue gas stream, said second flue gas stream, and said third flue gas stream comprise oxygen.

3. The method of claim 1 wherein oxygen is combined with said portion of said third flue gas stream to produce said regeneration stream.

4. The method of claim 1 further characterized in that the contacting of said catalyst with said feed stream deposits coke on said catalyst and deactivates said catalyst, and the contacting of said catalyst with said regeneration stream combusts at least a portion of said coke to produce said first flue gas stream comprising by-products of coke combustion including water.

5. The method of claim 1 wherein said purification zone comprises a cooling zone, and said cooling zone operates at a temperature of from 32° F. to 150° F.

6. The method of claim 1 wherein said purification zone comprises a compression zone, and said compression zone operates at a pressure of from 25 psig to 3000 psig.

7. The method of claim 1 wherein said second concentration of water is less than 10 mol-%.

8. The method of claim 7 wherein said second concentration of water is less than 500 mol-ppm.

9. The method of claim 8 wherein said second concentration of water is less than 50 mol-ppm.

10. The method of claim 1 wherein said catalytic hydrocarbon conversion process comprises reforming or dehydrocyclization.

11. A method of converting a hydrocarbon feed with a halogen-containing catalyst and regenerating the catalyst by contact with an oxygen-containing stream, said method comprising:
   (a) contacting a feed stream comprising hydrocarbons with a hydrocarbon conversion catalyst containing a halogen at hydrocarbon conversion conditions; withdrawing from said catalyst an effluent stream comprising hydrogen, light hydrocarbons, and heavy hydrocarbons; passing said effluent stream to a separation zone; recovering from said separation zone a first process gas stream comprising hydrogen and said light hydrocarbons and a first process liquid stream comprising said heavy hydrocarbons; passing said first process gas stream to a purification zone; and recovering from said purification zone a second process gas stream comprising hydrogen and a second process liquid stream comprising said light hydrocarbons;
   (b) discontinuing the contacting of said catalyst with said feed stream;
   (c) contacting said catalyst with a regeneration stream comprising an inert compound and oxygen and producing a first flue gas stream comprising said inert compound and water and having a first concentration of said halogen;
   (d) contacting said first flue gas stream with a wash stream comprising water to produce a second flue gas stream comprising said inert compound, water, and said halogen;
   (e) passing said second flue gas stream to said separation zone, and recovering from said separation zone a first waste liquid stream comprising water and a third flue gas stream comprising said inert compound, having a first concentration of water, and having a second concentration of said halogen that is less than said first concentration of said halogen;
   (f) passing said third flue gas stream to said purification zone, and withdrawing therefrom a fourth flue gas stream having a second concentration of water that is less than said first concentration of water and a second waste liquid stream comprising water; and
   (g) recovering at least a portion of said fourth flue gas stream as said regeneration stream.

* * * * *